(12) United States Patent
Ishigaki et al.

(10) Patent No.: US 9,404,589 B2
(45) Date of Patent: Aug. 2, 2016

(54) NON-SLIDING GATE VALVE

(71) Applicant: SMC CORPORATION, Chiyoda-ku (JP)

(72) Inventors: Tsuneo Ishigaki, Kitakatsushikagun (JP); Hiromi Shimoda, Noda (JP); Hiroshi Ogawa, Okegawa (JP)

(73) Assignee: SMC CORPORATION, Chiyoda-ku (JP)

( * ) Notice: Subject to any disclaimer, the term of this patent is extended or adjusted under 35 U.S.C. 154(b) by 109 days.

(21) Appl. No.: 14/323,434

(22) Filed: Jul. 3, 2014

(65) Prior Publication Data
US 2015/0014556 A1  Jan. 15, 2015

(30) Foreign Application Priority Data

Jul. 10, 2013 (JP) ................................. 2013-145033

(51) Int. Cl.
*F16K 3/18* (2006.01)
*F16K 51/02* (2006.01)
*F16K 3/316* (2006.01)
*F16K 31/12* (2006.01)

(52) U.S. Cl.
CPC .............. *F16K 3/184* (2013.01); *F16K 3/3165* (2013.01); *F16K 31/12* (2013.01); *F16K 51/02* (2013.01)

(58) Field of Classification Search
CPC ....... F16K 3/184; F16K 51/02; F16K 3/3165; F16K 31/12

USPC ...................... 251/12, 58, 193, 203, 204, 326
See application file for complete search history.

(56) References Cited

U.S. PATENT DOCUMENTS

2004/0129910 A1   7/2004  Ishigaki
2013/0112906 A1   5/2013  Ishigaki et al.

FOREIGN PATENT DOCUMENTS

JP    2004-197769 A    7/2004
JP    2013-96557       5/2013

OTHER PUBLICATIONS

Office Action issued Oct. 27, 2015 in Japanese Patent Application No. 2013-145033 (with English language translation).

*Primary Examiner* — Marina Tietjen
(74) *Attorney, Agent, or Firm* — Oblon, McClelland, Maier & Neustadt, L.L.P.

(57) ABSTRACT

A parallel movement mechanism including guide grooves and guide rollers and a perpendicular movement mechanism including cam grooves and cam rollers are interposed between a drive rod of an air cylinder and a valve assembly. By moving the valve assembly parallel to valve seat surfaces formed around a pair of openings of a valve casing with the parallel movement mechanism, and then moving it perpendicularly to the valve seat surfaces with the perpendicular movement mechanism, valve seal members of valve elements can be brought into and out of contact with the valve seat surfaces, and the openings can be selectively opened and closed.

4 Claims, 12 Drawing Sheets

(a)

(b)

NON-SLIDING GATE VALVE

TECHNICAL FIELD

The present invention relates to gate valves disposed between vacuum chambers in a semiconductor manufacturing apparatus or the like, and more specifically, it relates to gate valves capable of selectively opening and closing a first opening leading to a process chamber and a X second opening leading to a transfer chamber in a non-sliding manner.

BACKGROUND ART

Gate valves are generally used for opening and closing an opening leading to a vacuum chamber in a semiconductor manufacturing apparatus or the like, have a valve shaft to which a valve plate is attached, and an air cylinder connected to the valve shaft, and are configured to operate the valve shaft with the air cylinder, to thereby bring a seal member of the valve plate into and out of contact with a valve seat surface provided around the opening, and to thereby open and close the opening.

In relation to opening and closing the opening in gate valves, there are mainly known a method in which a valve shaft is rotated about a point, and the valve plate is thereby opened and closed, and a method in which a valve assembly composed of a valve shaft and a valve plate is moved perpendicularly to a valve seat surface, and the valve plate is thereby opened and closed.

A gate valve employing the latter method is capable of bringing the whole circumference of a seal member of a valve plate into and out of contact with a valve seat surface of the opening at the same time and thereby opening and closing the opening without sliding them relative to each other, is therefore called a non-sliding gate valve, is capable of suppressing twisting of the seal member, generation of abrasion powder, and so forth due to friction between the seal member and the seal surface, and therefore has attracted attention in recent years.

An example of such a non-sliding gate valve is disclosed in Patent Literature 1. The gate valve described in Patent Literature 1 has, as shown in FIG. 11 and FIG. 12, two cam grooves 130 formed in each of a pair of cam frames 128 fixed to drive rods 109 with a rod arm 124 therebetween in an oblique direction with respect to a valve seat surface 110, and two cam rollers 133 attached to each of the left side surface and the right side surface of a lever member 112 and fitted in the corresponding cam grooves 130. Stopping rollers 136 attached to the cam rollers 133 come into contact with contact portions 137 formed in roller frames 132. The cam frames 128 move upward with the upward movement of the lever member 112 stopped and a compression spring 125 compressed, and each cam groove 130 moves upward relative to the corresponding cam roller 133. Therefore, the cam rollers 133 are pressed by the groove walls of the sloping cam grooves 130, and the valve plate 105 and the valve shaft 107 move perpendicularly to the valve seat surface 110.

PATENT LITERATURE

[Patent Literature 1] Japanese Unexamined Patent Application Publication No. 2013-96557

Technical Problem

The non-sliding gate valve disclosed in Patent Literature 1 opens and closes an opening connected to a process chamber in a non-sliding manner. To improve the efficiency of maintenance work of a gate valve and a process chamber, a gate valve capable of opening and closing another opening connected to a transfer chamber in a non-sliding manner has been desired.

That is, it is an object of the present invention to provide a non-sliding gate valve capable of opening and closing not only a first opening connected to a process chamber but also a second opening connected to a transfer chamber in a non-sliding manner.

Solution to Problem

To attain the above object, a gate valve according to the present invention includes a valve casing in which side walls facing each other are provided with a first opening connected to a process chamber and a second opening connected to a transfer chamber, and valve seat surfaces parallel to each other are formed around the openings; a valve assembly including a valve shaft having a distal end and a proximal end in the longitudinal direction, and plate-like first and second valve elements attached to the distal end of the valve shaft and having valve seal members corresponding to the valve seat surfaces; and an air cylinder a drive rod of which is connected to the valve shaft. The valve assembly can be moved by the air cylinder from a fully opening position in which the valve elements are not opposite the openings, through a facing position in which the valve elements face the openings, to a first closing position in which the valve seal member of the first valve element is pressed against the valve seat surface around the first opening to close the first opening, and a second closing position in which the valve seal member of the second valve element is pressed against the valve seat surface around the second opening to close the second opening. The gate valve has a connecting mechanism connecting the drive rod and the valve shaft such that they can be displaced relative to each other, a parallel movement mechanism moving the valve assembly parallel to the valve seat surfaces, a perpendicular movement mechanism moving the valve assembly perpendicularly to the valve seat surfaces, and a stopper mechanism that, when the valve assembly is moved from the fully opening position to the facing position by the parallel movement mechanism, stops the parallel movement of the valve assembly and allows the perpendicular movement of the valve assembly by the perpendicular movement mechanism. The connecting mechanism has a rod arm fixed to the drive rod, a lever member fixed to the proximal end of the valve shaft, and a compression spring interposed between the lever member and the rod arm. The parallel movement mechanism has a pair of left and right cam frames fixed to the rod arm so as to face the left side wall and the right side wall of the lever member, a guide groove formed in each cam frame in the parallel movement direction, and a plurality of guide rollers attached to each of a pair of left and right roller frames fixed to a bonnet to which the valve casing is attached, and fitted in the guide groove. The perpendicular movement mechanism has a plurality of cam grooves formed in each of the pair of cam frames, and a plurality of cam rollers provided on each of the left and right side surfaces of the lever member and fitted in the cam grooves; the cam grooves have, in the parallel movement direction, a beginning end position on the valve element side, a terminal end position on the opposite side thereto, and an intermediate position provided therebetween, and in the perpendicular movement direction, the intermediate position is provided closer to the first opening than the beginning end position, and the terminal end position is provided closer to the second opening than the beginning end position; and the cam rollers are disposed at the beginning end positions during the parallel movement in which the valve assembly is moved from the fully opening position to the facing position, the valve assembly occupies the first closing position when the cam rollers are moved to the intermediate positions, and the valve assembly occupies the second closing position when the cam rollers are moved to the terminal end positions.

It is preferable in terms of strength that in the present invention, the guide groove formed in each of the pair of left and right cam frames have a widened portion having an enlarged groove width at the end closest to the valve elements, and one of the plurality of guide rollers attached to each of the left and right roller frames that is closest to the valve elements be formed so as to be larger in diameter than the others and be fitted in the widened portion.

It is preferable that in the present invention, the stopper mechanism have stopping rollers provided rotatably in the perpendicular movement direction and contact portions with which the stopping rollers come into and out of contact, the stopping rollers and the contact portions be provided on the lever member and the bonnet so as to face each other, and when the valve assembly is moved from the fully opening position to the facing position by the parallel movement mechanism, the stopping rollers come into contact with the contact portions and stop the parallel movement of the valve assembly, and when the valve assembly is moved perpendicularly by the perpendicular movement mechanism, the stopping rollers roll on the contact portions.

In this case, it is preferable that in the stopper mechanism, pairs of the stopping roller and the contact portion be provided on both left and right sides of the valve shaft, and it is more preferable that the contact portions include cushion rods having, at one longitudinal end thereof, contact surfaces with which the stopping rollers are rollably in contact, and cushion members with which the other longitudinal ends of the cushion rods are in contact.

According to the gate valve according to the present invention, by moving the valve assembly having the first valve element and the second valve element perpendicularly to the valve seat surfaces around the first opening and the second opening, the valve seal members of the valve elements can be brought into and out of contact with the valve seat surfaces in a non-sliding manner, and therefore twisting of the valve seal members, generation of abrasion powder, and so forth can be suppressed not only when opening and closing the first opening connected to the process chamber but also when opening and closing the second opening connected to the transfer chamber. As a result, also when closing the second opening at the time of maintenance work of the process chamber, the first valve element, and so forth, vacuum leakage due to twisting of the valve seal member, generation of abrasion powder, and so forth can be suppressed, and the efficiency of maintenance work can be improved.

DESCRIPTION OF EMBODIMENTS

Figure 1:
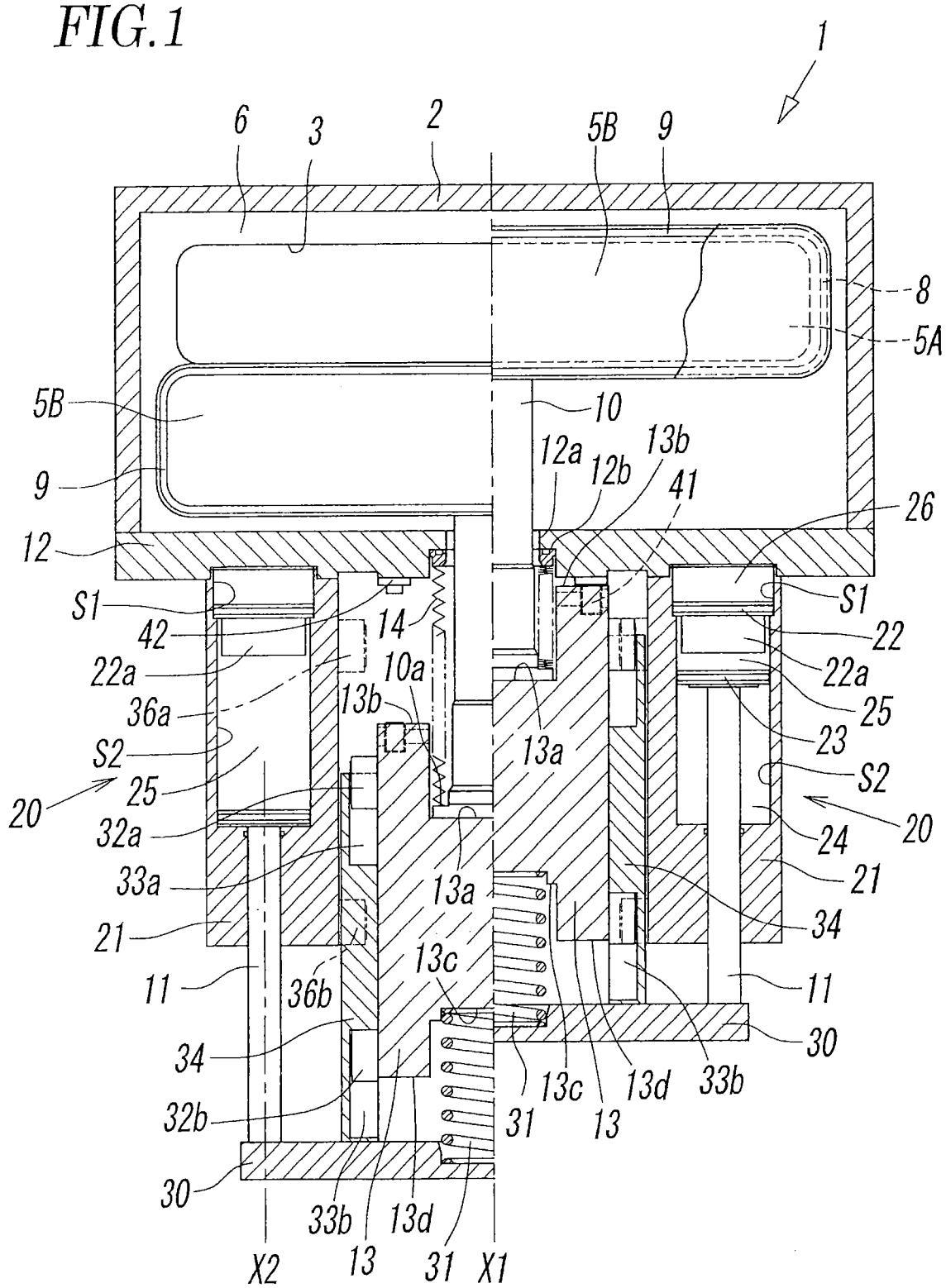
FIG. 1 is a partial sectional view showing an embodiment of a gate valve according to the present invention, the left half shows a state in which a valve assembly is at a fully opening position, and the right half shows a state in which the valve assembly is at a facing position.

A non-sliding gate valve 1 according to the present invention is disposed between vacuum chambers in a semiconductor manufacturing apparatus or the like, is capable of selectively opening and closing two openings leading to a process chamber and a transfer chamber in a non-sliding manner, and includes a valve casing 2 having a first opening 3 and a second opening 4 facing each other and valve seat surfaces 6 and 7 parallel to each other formed around the openings, a first valve element 5A that is housed in the valve casing 2 and to a surface of which closest to the first opening 3 a valve seal member 8 formed of an elastic material such as an O-ring is attached, a second valve element 5B to a surface of which closest to the second opening 4 a valve seal member 9 formed of an elastic material such as an O-ring is attached, a valve shaft 10 to the distal end of which the first and second valve elements 5A and 5B are attached back to back with each other, and air cylinders 20 drive rods 11 of which are connected to the valve shaft 10.

A valve assembly 15 is formed by the first and second valve elements 5A and 5B and the valve shaft 10.

Figure 3:
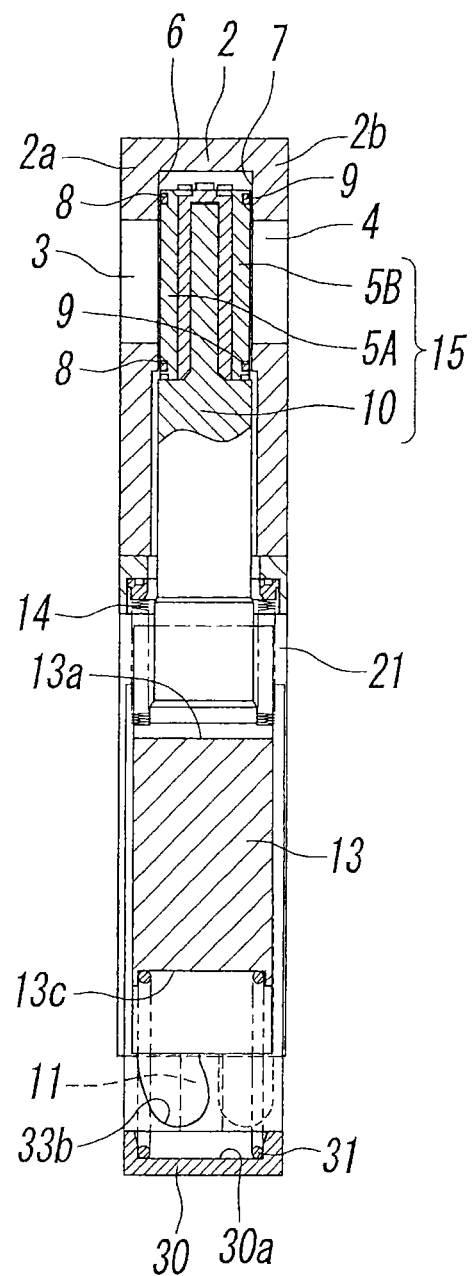
FIG. 3 is a vertical sectional view along axis line X1 of FIG. 1.

The valve casing 2 has a substantially rectangular parallelepiped box shape as can be seen from FIG. 1 and FIG. 3, and opposite left and right side walls 2a and 2b thereof are provided with the first opening 3 and the second opening 4, respectively, which are horizontally elongate and substantially rectangular. The first opening 3 is connected to a process chamber (not shown), and the second opening 4 is connected to a transfer chamber (not shown).

The first and second valve elements 5A and 5B open and close the first and second openings 3 and 4, respectively, have a horizontally elongate rectangular shape as with the first and second openings 3 and 4, and are formed in a plate shape having a larger area than the openings.

Of the two side walls 2a and 2b, one side wall 2a (closest to the process chamber) has, on the inner surface thereof, the valve seat surface 6, which is a flat surface and is formed in a substantially rectangular ring shape surrounding the first opening 3. The valve seal member 8, which is formed in a substantially rectangular ring shape and comes into contact with the valve seat surface 6 to hermetically seal the first opening 3, is attached to the surface of the first valve element 5A closest to the first opening 3. As with the one side wall 2a, the other side wall 2b has, on the inner surface thereof, the valve seat surface 7, which is a flat surface and is formed in a substantially rectangular ring shape surrounding the second opening 4. The valve seal member 9, which is formed in a substantially rectangular ring shape and comes into contact with the valve seat surface 7 to hermetically seal the second opening 4, is attached to the surface of the second valve element 5B closest to the second opening 4.

The first and second valve elements 5A and 5B are attached, with the valve seal member 8, 9 attachment surfaces thereof back to back with each other, to surfaces facing the pair of side walls 2a and 2b and formed at the distal end (the upper end in FIG. 1) of the valve shaft 10, which is cylindrical, with disengageable fasteners such as screws detachably and fixedly. A bonnet 12 is hermetically fixed to a bottom surface of the valve casing 2 that is substantially perpendicular to the side walls 2a and 2b, and the proximal end (the lower end in FIG. 1) of the valve shaft 10 extends to the outside of the valve casing 2 through a through-hole 12a provided in the center of the bonnet 12. At this time, the through-hole 12a has a minimum diameter slightly larger than the diameter of the valve shaft 10 in order to allow the vertical movement of the whole valve assembly 15 described later. The axis line X1 of the valve shaft 10 is parallel to the valve seat surfaces 6 and 7, and therefore the whole valve assembly 15 is parallel to the valve seat surfaces 6 and 7.

A lever member 13 is fixed to the proximal end of the valve shaft 10. The lever member 13 is formed in a substantially H-shape, and has a first recessed portion 13a formed in the center of the side closest to the bonnet 12 (the upper side in FIG. 1), a pair of first shoulder portions 13b formed on the left and right of the recessed portion 13a and forming side walls of the recessed portion 13a, a second recessed portion 13c formed in the center of the side opposite to the bonnet 12 in the direction of the axis line X1 (the lower side in FIG. 1), and a pair of second shoulder portions 13d formed on the left and right of the recessed portion 13c and forming side walls of the recessed portion 13c. The proximal end of the valve shaft 10 is fixed to the first recessed portion 13a, and one end of a compression spring 31 described later in detail is attached to the second recessed portion 13c on the side opposite thereto.

The valve assembly 15 sequentially moves from a fully opening position in which the first and second valve elements 5A and 5B are not opposite the first opening 3 and the second opening 4 and fully open both the openings 3 and 4, through a facing position in which the valve elements 5A and 5B face both the openings 3 and 4 with a gap therebetween, to a first closing position in which the valve seal member 8 of the first valve element 5A is pressed against the valve seat surface 6 around the first opening 3 to hermetically close the first opening 3, and a second closing position in which the valve seal member 9 of the second valve element 5B is pressed against the valve seat surface 7 around the second opening 4 to hermetically close the second opening 4.

The through-hole 12a has an enlarged diameter portion 12b having an enlarged diameter on the side thereof closest to the proximal end of the valve shaft 10 (on the side thereof closest to the outer surface of the bonnet 12). One end of a bellows 14 covering the valve shaft 10 is attached to the enlarged diameter portion 12b. The other end of the bellows 14 is fixed to a flange 10a at the proximal end of the valve shaft 10. The bellows 14 is formed so as to expand and contract with the vertical movement of the valve shaft 10. Both ends of the bellows 14 are hermetically fixed, and the inside of the valve casing 2 is completely cut off from the outside by the bellows 14.

Two air cylinders 20 each having the drive rod 11 are fixed to the outer surface of the bonnet 12 so as to face each other with the valve shaft 10 and the lever member 13 therebetween. Specifically, the air cylinders 20 include a cylinder housing 21 the outer peripheral shape of the cross-section of which is formed in a substantially rectangular shape, a stop piston 22 provided on the upper head side (the side on which the drive rod 11 is not led to the outside), a drive piston 23 disposed below the stop piston 22, on the rod side (the side on which the drive rod is led to the outside), and coaxially with the stop piston 22, and the drive rod 11 the proximal end of which is fixed to the drive piston 23. The pair of air cylinders 20, 20 are fixed on the head side thereof to the lower surface of the bonnet 12, with the axis lines X2 of the drive rods 11 parallel to the axis line X1 of the valve shaft 10.

A part of the cylinder housing 21 doubles as a roller frame to which first and second guide rollers 36a and 36b described later are attached. So, in the following description, the part of the cylinder housing 21 to which the guide rollers 36a and 36b are attached will also be referred to as a "roller frame 27." However, the roller frame 27 may also be formed separately from the cylinder housing 21.

A first cylinder S1 having a large diameter is formed on the head side of the inside of the cylinder housing 21, a second cylinder S2 having a small diameter is formed on the rod side thereof, and the cylinders S1 and S2 communicate with each other. The stop piston 22 is slidably disposed in the first cylinder S1, the drive piston 23 is slidably disposed in the second cylinder S2, and a cylindrical stopper 22a having a diameter smaller than the inside diameter of the second cylinder S2 is fixed to the rod side of the stop piston 22.

As a result, in the air cylinders 20, a first cylinder chamber 24 is formed on the rod side of the drive piston 23, a second cylinder chamber 25 is formed between the drive piston 23 and the stop piston 22, and a third cylinder chamber 26 is formed on the head side of the stop piston 22. The first cylinder chamber 24, the second cylinder chamber 25, and the third cylinder chamber 26 are each provided with an intake/exhaust port (not shown).

The distal ends of the drive rods 11 of the air cylinders 20 are fixed to the left and right ends of a plate-like rod arm 30 extending horizontally on the side of the lever member 13 opposite to the bonnet 12 (below the lever member 13). The compression spring 31 is interposed between the second recessed portion 13c as a spring seat of the lever member 13 and a recessed spring seat 30a formed in a surface of the rod arm 30 facing the second recessed portion 13c (the upper surface of the rod arm 30).

The compression spring 31 interposed between the rod arm 30 and the lever member 13 has a spring force capable of supporting the weights of the valve assembly 15 and the lever member 13. This spring force presses second cam rollers 32b described later against the upper ends of second cam grooves 33b closest to the valve elements 5A and 5B, and the valve assembly 15 and the rod arm 30 are thereby integrated when the valve elements 5A and 5B are moved upward and parallel to the first and second openings 3 and 4. When the valve elements 5A and 5B are moved perpendicularly to the first and second openings, the compression spring 31 is compressed and allows the relative movement between the valve assembly 15 and the rod arm 30. That is, the compression spring 31, the lever member 13, and the rod arm 30 form a connecting mechanism for connecting the valve shaft 10 and the drive rods 11 such that they can be displaced relative to each other.

A pair of left and right plate-like cam frames 34, 34 are fixed to the upper surface of the rod arm 30 so as to be parallel to the axis line X1 of the valve shaft 10, with their inner surfaces facing the left side surface and the right side surface of the lever member 13. A bottomed guide groove 35 extending in the parallel movement direction along the axis X1 is formed in the outer surface of each cam frame 34, 34 facing the roller frame 27, 27. Two upper and lower bottomed first and second cam grooves 33a and 33b are formed in each inner surface along the axis X1. At this time, the depths of the guide groove 35 and the cam grooves 33a and 33b are greater than half of the thickness of the cam frame 34. So, the guide groove 35 and the cam grooves 33a and 33b are shifted in the width direction of the cam frame 34 so as not to overlap each other in the thickness direction of the cam frame 34.

The number of the cam grooves 33a and 33b and the positional relationship therebetween are not limited to those in this embodiment. Three or more cam grooves may be formed in each cam frame 34, and cam grooves may be offset from one another in the width direction of the cam frame 34. If the strength of the cam frame 34 can be secured, the guide groove 35 and the cam grooves 33a and 33b may be formed through the cam frame 34.

Figure 2:
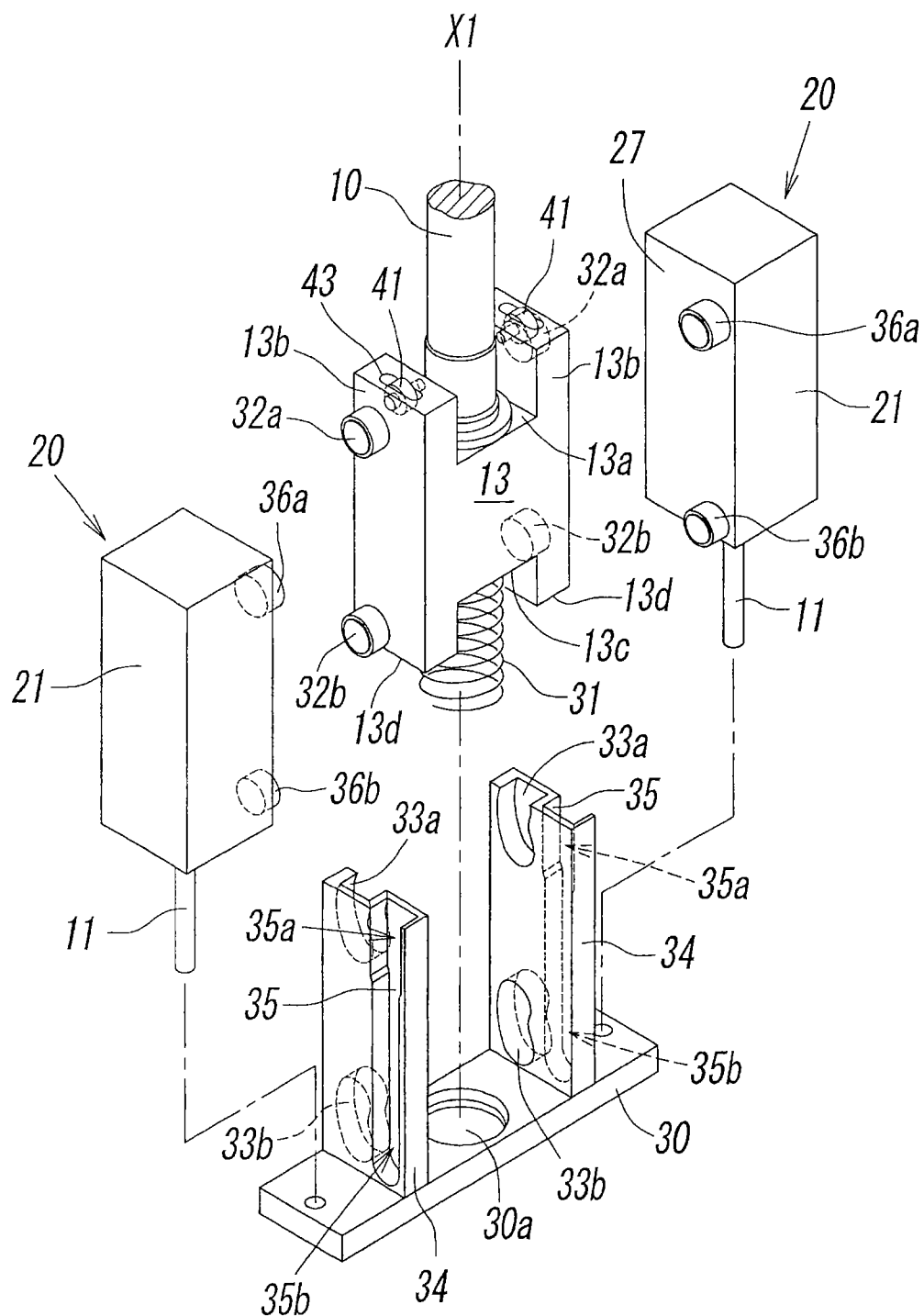
FIG. 2 is an exploded perspective view showing a part of FIG. 1.

The guide groove 35 is continuously formed by a widened portion 35a having an enlarged groove width, and a narrow portion 35b formed narrower than the widened portion 35a. The widened portion 35a is provided at the end closest to the valve elements 5A and 5B (on the upper side in FIG. 2), and the narrow portion 35b is provided on the side closest to the rod arm 30 (on the lower side in FIG. 2). At this time, the end of the guide groove 35 closest to the valve elements, that is, the end of the widened portion 35a closest to the valve elements is open on the upper end face of the cam frame 34.

The first and second cam grooves 33a and 33b each have an A position (beginning end position), a B position (intermediate position), and a C position (terminal end position) in order from the valve element 5A, 5B side (the upper side in FIG. 4) toward the lever member 13 side opposite thereto (the lower side in FIG. 4) in the parallel movement direction parallel to the axis line X1. In the perpendicular movement direction perpendicular to the axis line X1, the B position is disposed closer to the first opening 3 than the A position (to the left of the A position in FIG. 4), and the C position is disposed closer to the second opening 4 than the A position (to the right of the A position in FIG. 4). That is, the cam grooves 33a and 33b are each formed in a curved shape convex toward the first opening 3 side and extending vertically. The two cam grooves 33a and 33b have the same cam shape and are disposed along the axis line X1. The end closest to the valve elements 5A and 5B (the upper end) of the cam groove 33a is open on the upper end face of the cam frame 34.

Two first and second guide rollers 36a and 36b fitted in the guide groove 35 are attached to each of the inner side surfaces of the cylinder housings 21 of the two air cylinders 20 facing the valve shaft 10 so as to be vertically spaced along the axis line X1. At this time, the upper first guide roller 36a is fitted in and guided by the widened portion 35a of the guide groove 35, and is therefore formed so as to have a larger diameter than the other lower guide roller 36b fitted in the narrow portion 35b. To suppress rattling during guiding, it is preferable that the diameter of the first guide roller 36a be substantially equal to the width of the widened portion 35a, and the diameter of the second guide roller 36b be substantially equal to the width of the narrow portion 35b.

Figure 4:
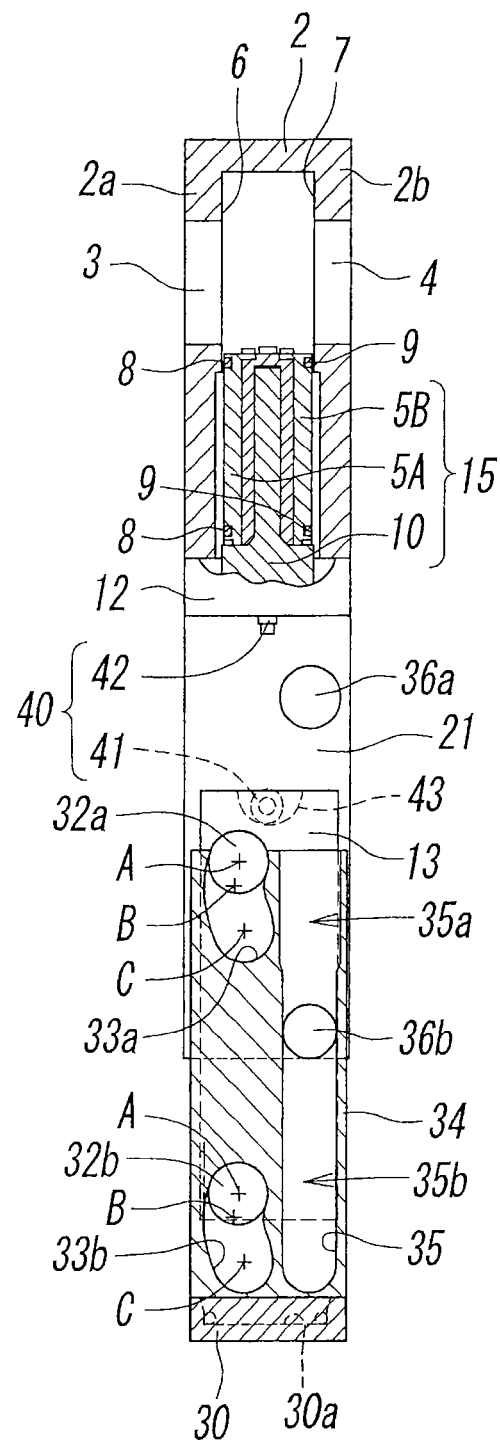
FIG. 4 is a vertical sectional view of the main part of the left half of FIG. 1.
Figure 5:
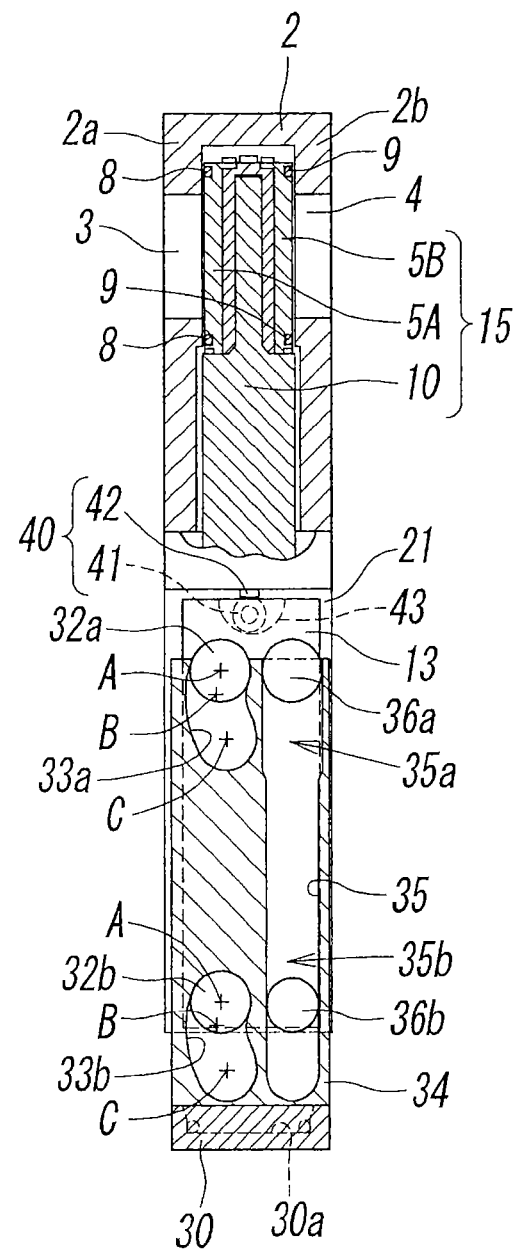
FIG. 5 is a vertical sectional view of the main part of the right half of FIG. 1.

The guide rollers 36a and 36b are configured such that when the valve assembly 15 is at the fully opening position, as shown in FIG. 4, only the lower second guide roller 36b is fitted in the guide groove 35, and such that when the valve assembly 15 reaches the facing position, as shown in FIG. 5, the upper first guide roller 36a is fitted into the widened portion 35a of the guide groove 35 through the opening at the upper end of the guide groove 35.

Thus, the valve assembly 15 is movable from the fully opening position to the facing position parallel to the valve seat surfaces 6 and 7. The cam frame 34, the guide groove 35, and the guide rollers 36a and 36b form a parallel movement mechanism for moving the valve assembly 15 vertically, parallel to the valve seat surfaces 6 and 7.

Two first and second cam rollers 32a and 32b fitted in the two cam grooves 33a and 33b, respectively, formed in each cam frame 34 are attached to each of the left side surface and the right side surface of the lever member 13. At this time, the two cam rollers 32a and 32b are vertically spaced, and are fitted in the two cam grooves 33a and 33b, respectively.

After the valve assembly 15 is moved from the fully opening position to the facing position by the parallel movement mechanism, the rod arm 30 is moved further upward, with the valve assembly 15 stopped at the facing position by a stopper mechanism described later, and the cam frames 34 are moved upward while compressing the compression spring 31. Owing to the upward movement of the cam grooves 33a and 33b, the cam rollers 32a and 32b are pressed by parts of the cam grooves sloping toward the first opening 3 side and are moved from the A position to the B position. At that time, the cam rollers 32a and 32b move in a direction approaching the valve seat surface 6 of the first opening 3 perpendicularly to the valve seat surface 6, and the valve assembly 15 is thereby moved in the same direction. As a result, the valve assembly 15 occupies the first closing position in which the valve seal member 8 of the first valve element 5A is pressed against the valve seat surface 6 of the first opening 3 to hermetically close the first opening 3.

When the cam frames 34 are moved further upward, owing to the further upward movement of the cam grooves 33a and 33b, the cam rollers 32a and 32b are pressed by parts of the cam grooves sloping toward the second opening 4 side and are moved from the B position to the C position. At that time, the cam rollers 32a and 32b move in a direction approaching the valve seat surface 7 of the second opening 4 perpendicularly to the valve seat surface 7, and the valve assembly 15 is thereby moved in the same direction. As a result, the first valve element 5A is separated from the first opening 3, and the valve assembly 15 occupies the second closing position in which the valve seal member 9 of the second valve element 5B is pressed against the valve seat surface 7 of the second opening 4 to hermetically close the second opening 4.

Thus, the cam grooves 33a and 33b and the cam rollers 32a and 32b form a perpendicular movement mechanism for moving the valve assembly 15 perpendicularly to the valve seat surfaces 6 and 7.

This gate valve 1 further has a stopper mechanism 40 that, when the valve assembly 15 is moved from the fully opening position to the facing position by the parallel movement mechanism, stops the parallel movement of the valve assembly 15, and allows the perpendicular movement of the valve assembly 15 by the perpendicular movement mechanism. The stopper mechanism 40 has stopping rollers 41 that are provided rollably in the perpendicular movement direction at the upper ends of the pair of shoulder portions 13b, 13b formed on the side of the lever member 13 closest to the bonnet 12, and contact portions 42 that are provided on parts of the outer surface (lower surface) of the bonnet 12 facing the stopping rollers 41 and with which the stopping rollers 41 are brought into and out of contact. That is, pairs of the stopping roller 41 and the contact portion 42 are provided on both left and right sides of the valve shaft 10.

Figure 7:
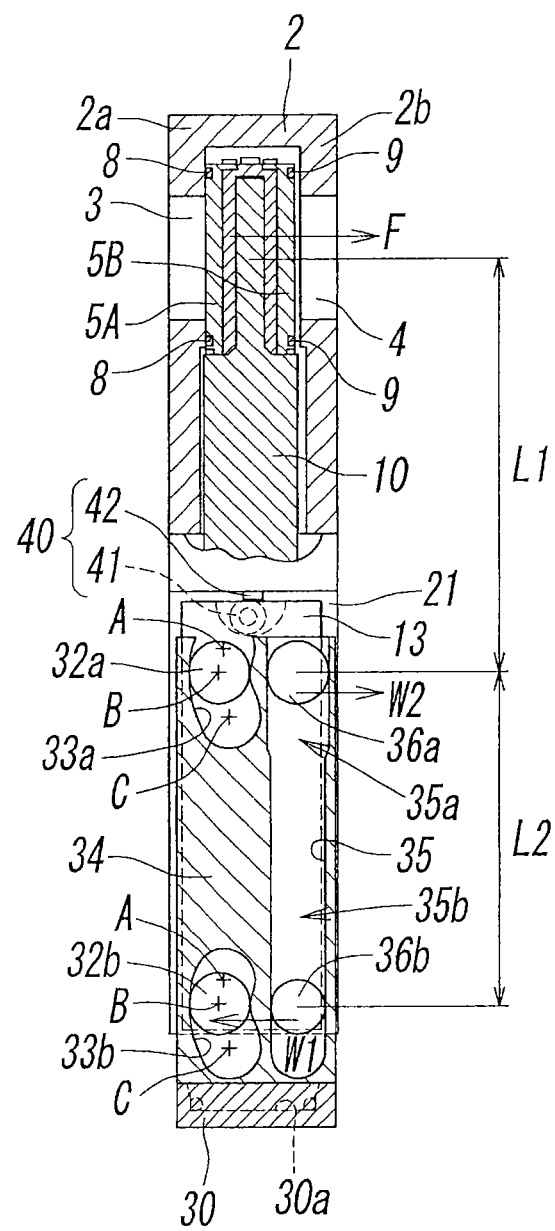
FIG. 7 is a vertical sectional view of FIG. 6.
Figure 9:
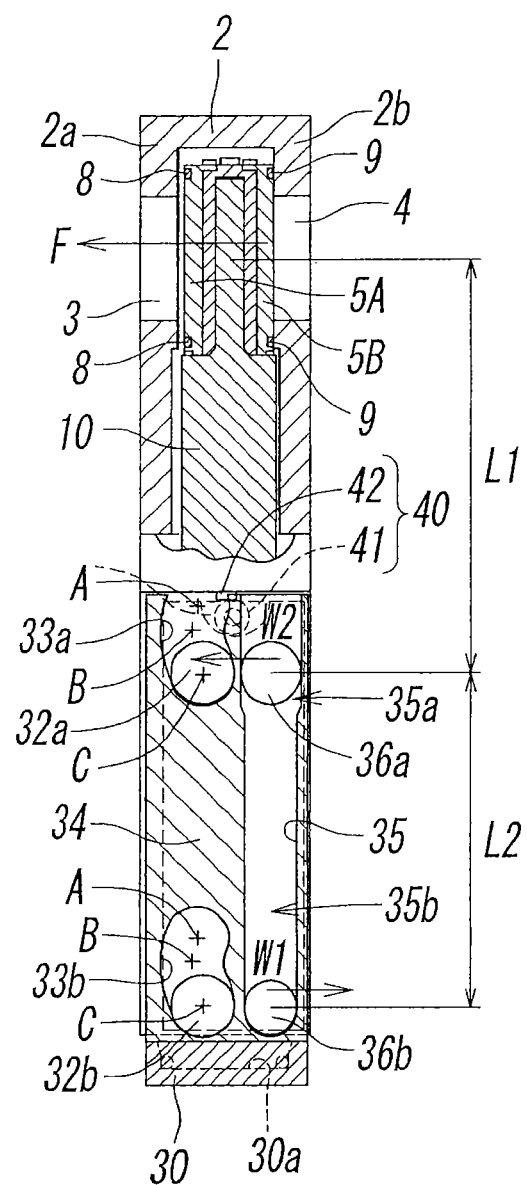
FIG. 9 is a vertical sectional view of FIG. 8.

As shown in FIG. 5, when the valve assembly 15 is moved from the fully opening position to the facing position by the parallel movement mechanism, the stopping rollers 41 come into contact with the contact portions 42 and stop the parallel movement of the valve assembly 15, and as shown in FIG. 7 and FIG. 9, with the perpendicular movement of the valve assembly 15 by the perpendicular movement mechanism, the stopping rollers 41 roll on the contact portions 42 in the perpendicular movement direction.

Figure 10:
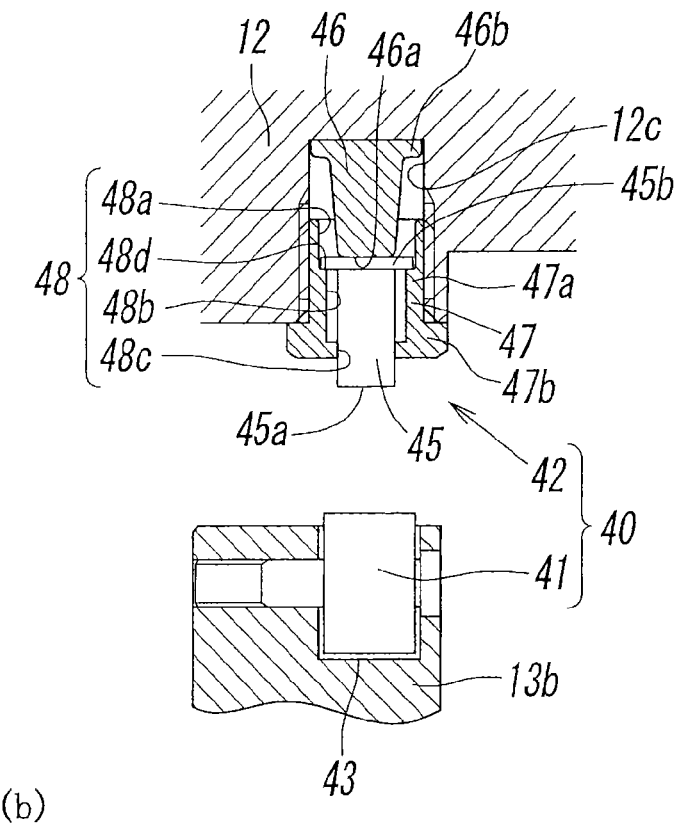
FIG. 10 (a) is a sectional view of a stopper mechanism, and FIG. 10 (b) is a sectional view showing a state in which a stopping roller is in contact with a cushion rod of a contact portion.
Figure 10:
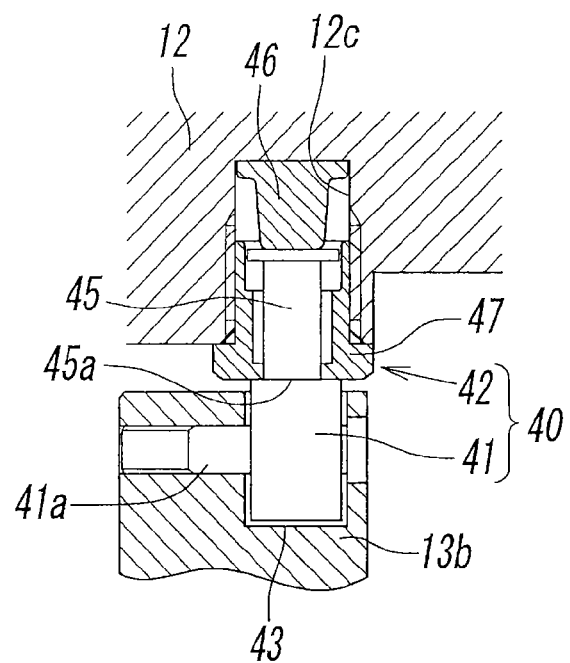
Figure 11:
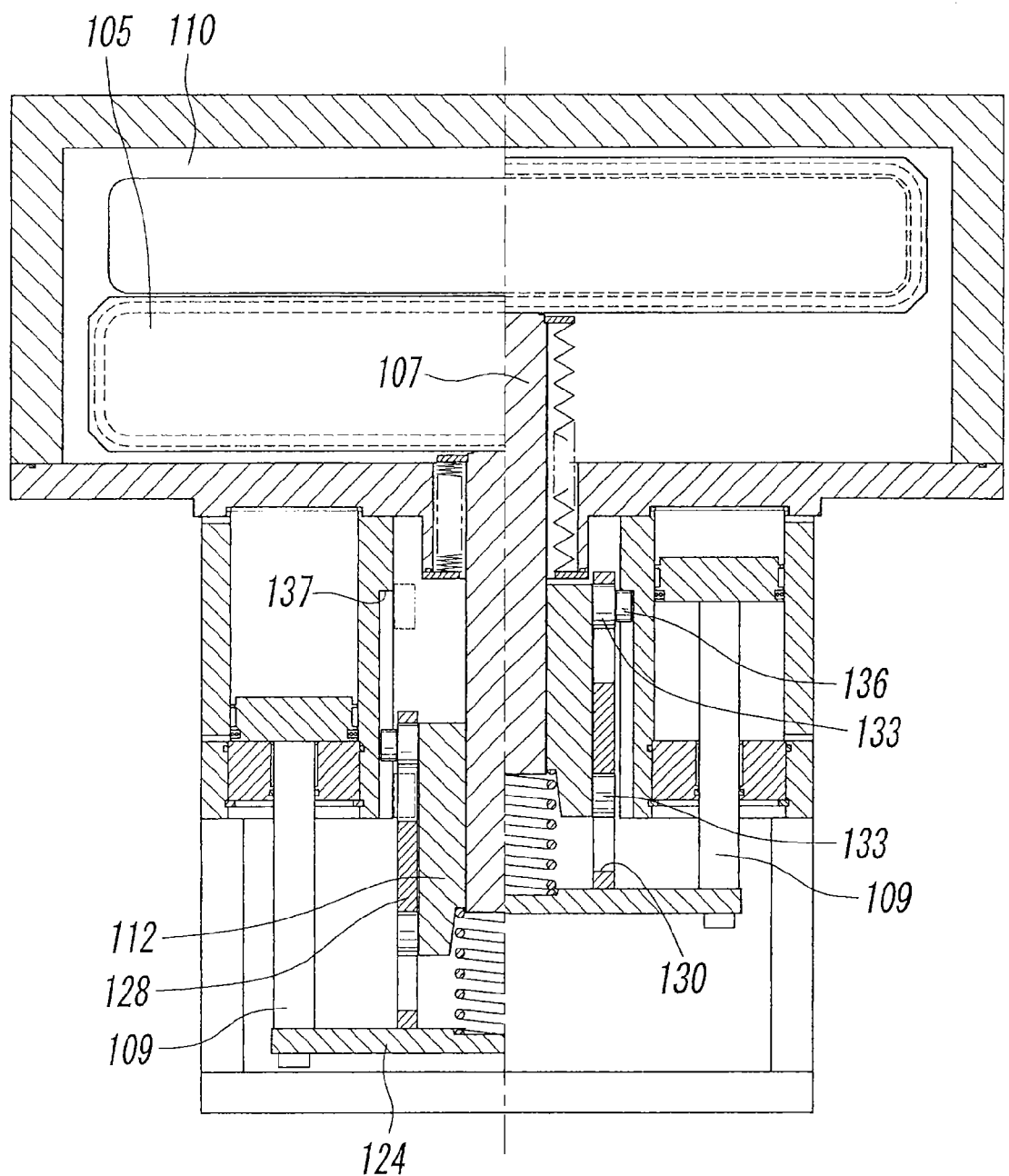
FIG. 11 is a sectional view of a conventionally used gate valve, the left half shows a state in which a valve plate is at a valve opening position, and the right half shows a state in which the valve plate is at a facing position.
Figure 12:
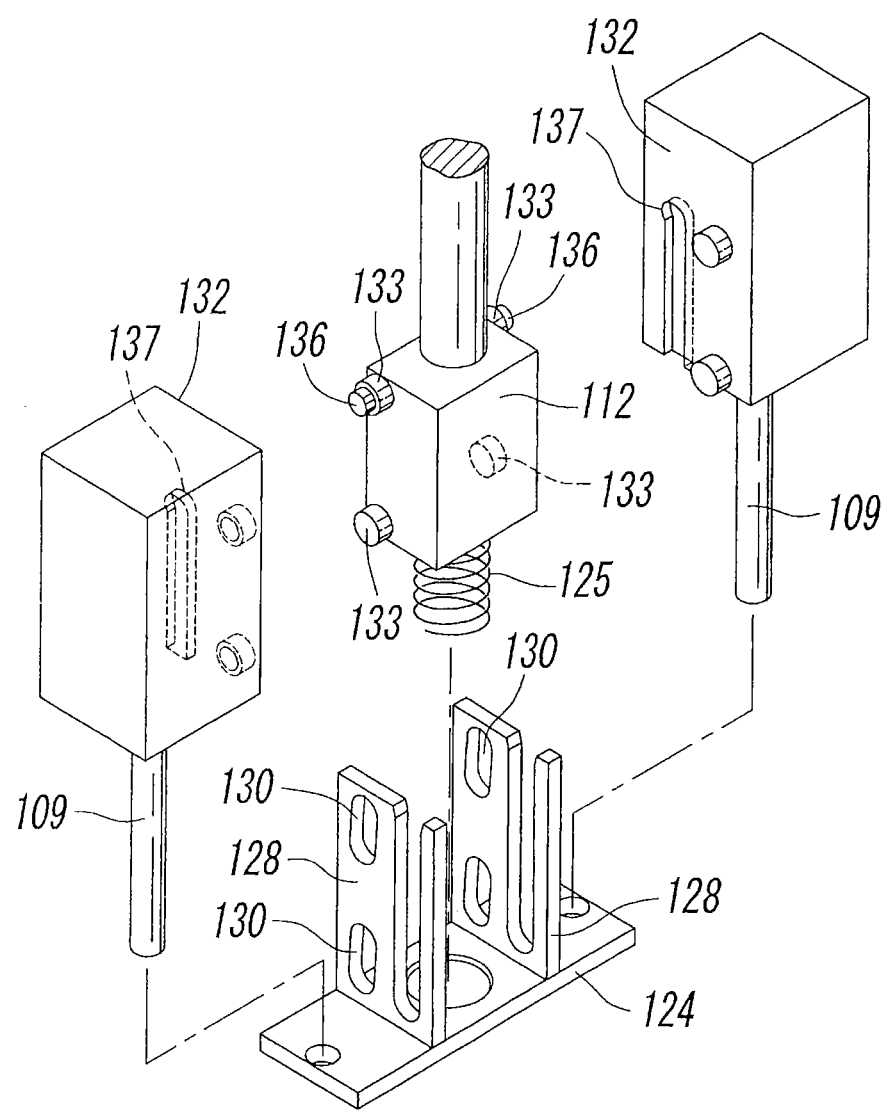
FIG. 12 is an exploded perspective view showing the main part of FIG. 11.

As shown in FIG. 10, the stopping rollers 41 are rotatably supported by rotating shafts 41a thereof in roller housing portions 43 provided in the upper end faces of the shoulder portions 13b, and parts of the stopping rollers 41 project from the upper end faces. It is preferable in terms of strength that as in this embodiment, the roller housing portions 43 be holes provided in the upper end faces of the shoulder portions 13b and both ends of the rotating shafts 41a be supported by the shoulder portions 13b. However, cutouts as the roller housing portions 43 may be formed in corners of the upper ends of the shoulder portions 13b, and only one end of each of the rotating shafts 41a may be supported by the shoulder portions 13b.

As shown in FIG. 10, the contact portions 42 have cushion rods 45 having, at one longitudinal end (the lower end in FIG. 10) thereof, contact surfaces 45a with which the stopping rollers 41 are rollably in contact, cushion members 46 with which the other longitudinal ends (the upper ends in FIG. 10) of the cushion rods 45 are in contact, and cushion holders 47 for attaching the cushion rods 45 and the cushion members 46 to the lower surface side of the bonnet 12.

More specifically, cushion housing holes 12c that are formed for attaching the contact portions and that are substantially circular in cross-section and bottomed are provided in the lower surface of the bonnet 12, and female threads are formed on the inner peripheral surfaces thereof. The cushion rods 45 are formed of an inelastic material in a substantially cylindrical shape, the contact surfaces 45a provided at one end thereof are formed flat, and flange portions 45b are formed at the other end thereof. The cushion members 46 are formed of an elastic material having a cushioning function in a substantially truncated cone shape the diameter of which decreases toward one end (the lower end in FIG. 10) thereof, and have distal end faces 46a at this end, and flange portions 46b having a diameter substantially equal to or slightly smaller than that of the cushion housing holes 12c are formed at the other end (the upper end in FIG. 10) thereof. The cushion holders 47 are formed in a substantially cylindrical shape having a through-hole 48 between one end (the lower end in FIG. 10) thereof and the other end (the upper end in FIG. 10) thereof, and have tubular portions 47a on the outer peripheral surfaces of which male threads screwed into the female threads of the cushion housing holes 12c are formed, and flange portions 47b formed at the lower ends of the tubular portions 47a so as to be larger in diameter than the tubular portions 47a and the cushion housing holes 12c.

The through-holes 48 of the cushion holders include large diameter portions 48a at the upper end, small diameter portions 48c at the lower end, and intermediate diameter portions 48b located therebetween. The cushion rods 45 are formed to be slightly smaller in diameter than the small diameter portions 48c so that they can be slidably inserted into the through-holes 48 of the holders and can be protruded and retracted through the openings at the lower ends of the holders 47. The flange portions 45b of the cushion rods 45 are formed so as to be slightly smaller in diameter than the large diameter portions 48a and larger in diameter than the intermediate diameter portions 48b, and are disposed in the large diameter portions 48a. Therefore, when the stopping rollers 41 are not in contact with the contact portions 42, the flange portions 45b are engaged with step portions 48d formed at the borders between the large diameter portions 48a and the intermediate diameter portions 48b, with the rods 45 protruded from the lower ends of the cushion holders 47, so that the cushion rods 45 do not fall out of the through-holes 48.

In the contact portions, the cushion members 46 are housed in the cushion housing holes 12c with the flange portions 46b in contact with the bottom surfaces of the cushion housing holes 12c; the cushion rods 45 are disposed coaxially with the cushion members 46, with the flange portions 45b in contact with the distal end faces 46a of the cushion members 46 and engaged with the step portions 48d on the inner peripheries of the cushion holders; and as described above, the cushion holders 47 are fixed to the cushion housing holes 12c by screwing, with the distal ends including the contact surfaces 45a of the cushion rods 45 protruded through the openings of the flange portions 47b at the lower ends thereof, and hold the cushion members 46 and the cushion rods 45 in the cushion housing holes 12c.

Thus, when the lever member 13 is moved upward, the valve assembly 15 reaches the facing position, and the stopping rollers 41 come into contact with the rods 45, as shown in FIG. 10 (b), the cushion members 46 are compressed, and the shock is absorbed. At that time, as shown in the figure, the contact surfaces 45a of the cushion rods 45 are pressed up so as to be substantially flush with the openings of the cushion holders 47. When the valve assembly 15 is perpendicularly moved by the perpendicular movement mechanism, the stopping rollers 41 roll on the contact surfaces 45a of the cushion rods 45 in the perpendicular movement direction.

Next, the operation of the gate valve 1 having the above-described configuration will be described. The left half of FIG. 1 and FIG. 4 show a state in which the valve assembly 15 occupies the fully opening position in which the first and second valve elements 5A and 5B are separated from the first opening 3 and the second opening 4 and retracted to the lower end of the valve casing 2, that is, a state in which the process chamber (not shown) connected to the first opening 3 and the transfer chamber (not shown) connected to the second opening 4 are communicated with each other, and a workpiece can be conveyed between the vacuum chambers. At this time, the drive rods 11 of the air cylinders 20 are completely extended downward, and the valve assembly 15 including the first and second valve elements 5A and 5B is maximally lowered. Thus, the cam rollers 32a and 32b are disposed at the A positions of the cam grooves 33a and 33b by the spring force of the compression spring 31, and the drive rods 11 and the valve assembly 15 are thereby integrated with the rod arm 30, the cam frames 34, and the lever member 13 therebetween. As described above, of the first and second guide rollers 36a and 36b, only the lower small-diameter second guide rollers 36b are fitted in the guide grooves 35.

In the following description, the drive rods 11 and the cam frames 34 which are stationary relative to each other will be referred to as "a rod-side assembly," and the valve assembly 15 (the valve shaft 10 and the first and second valve elements 5A and 5B) and the lever member 13 which are stationary relative to each other will be referred to as "a shaft-side assembly."

In the state of the fully opening position, the air in the second cylinder chambers 25 is released to the outside, pressure air is supplied to the first cylinder chambers 24 and the third cylinder chambers 26 so as to move the drive rods 11 upward, and the rod-side assembly and the shaft-side assembly are thereby moved upward integrally with each other. As shown in the right half of FIG. 1 and FIG. 5, the valve assembly 15 reaches the facing position in which the first and second valve elements 5A and 5B face the first and second openings 3 and 4, respectively, but the valve seal members 8 and 9 are separated from the valve seat surfaces 6 and 7.

At this time, in the early stage of upward movement of the rod-side assembly and the shaft-side assembly, as shown in FIG. 4, the cam frames 34 are guided by the lower second guide rollers 36b fitted in the guide grooves 35, and the rod-side assembly and the shaft-side assembly are thereby moved parallel to the valve seat surfaces 6 and 7 with the axis line X1 of the valve shaft 10 kept parallel to the valve seat surfaces 6 and 7. When the valve assembly 15 approaches the facing position, as shown in FIG. 5, the first guide rollers 36a are fitted into the guide grooves 35 through the openings at the upper ends.

Figure 6:
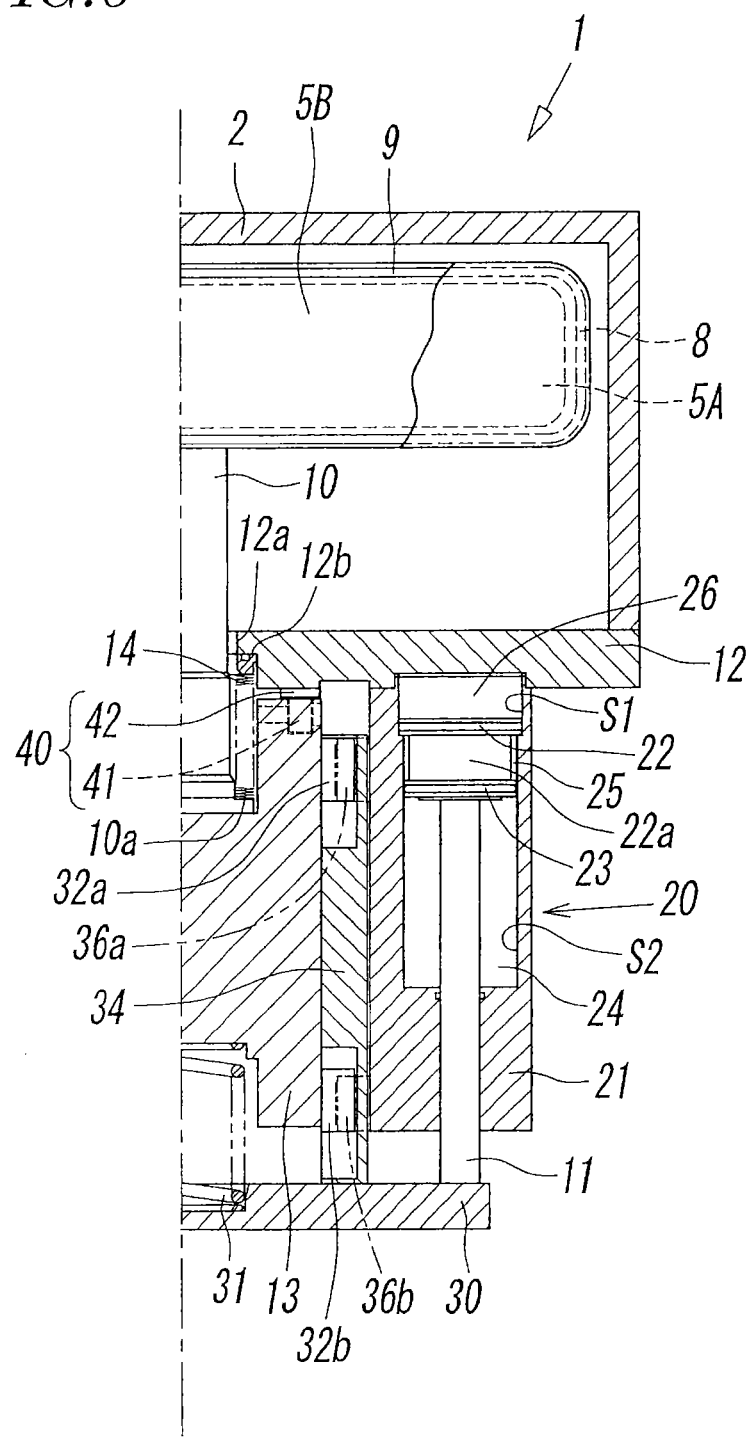
FIG. 6 is a sectional view showing a state in which the valve assembly is at a first closing position.

When the valve assembly 15 reaches the facing position, as shown in FIG. 5 by chain line, the stopping rollers 41 come into contact with the contact portions 42, and the shaft-side assembly is thereby stopped at that position. However, after the shaft-side assembly is stopped, since the air in the second cylinder chambers 25 is released to the outside, the rod-side assembly continues to move upward while compressing the compression spring 31, and the first and second cam grooves 33a and 33b formed in the cam frames 34 move upward relative to the first and second cam rollers 32a and 32b, respectively. The cam grooves 33a and 33b move upward until the drive pistons 23 come into contact with the stoppers 22a of the stop pistons 22 as shown in FIG. 6. At this time, as shown in FIG. 7, the cam rollers 32a and 32b move to the B positions of the cam grooves 33a and 33b, respectively. At that time, the cam rollers 32a and 32b are pressed by the sloping groove walls of the cam grooves 33a and 33b, and move in a direction approaching the valve seat surface 6 of the first opening 3, perpendicularly to the valve seat surface 6. As a result, the shaft-side assembly moves together with the cam rollers 32a and 32b in the same direction, therefore the valve assembly 15 moves to the first closing position, the valve seal member 8 of the first valve element 5A is pressed against the valve seat surface 6, and the first opening 3 is hermetically closed. In the process chamber thus hermetically closed, a workpiece is processed.

Figure 8:
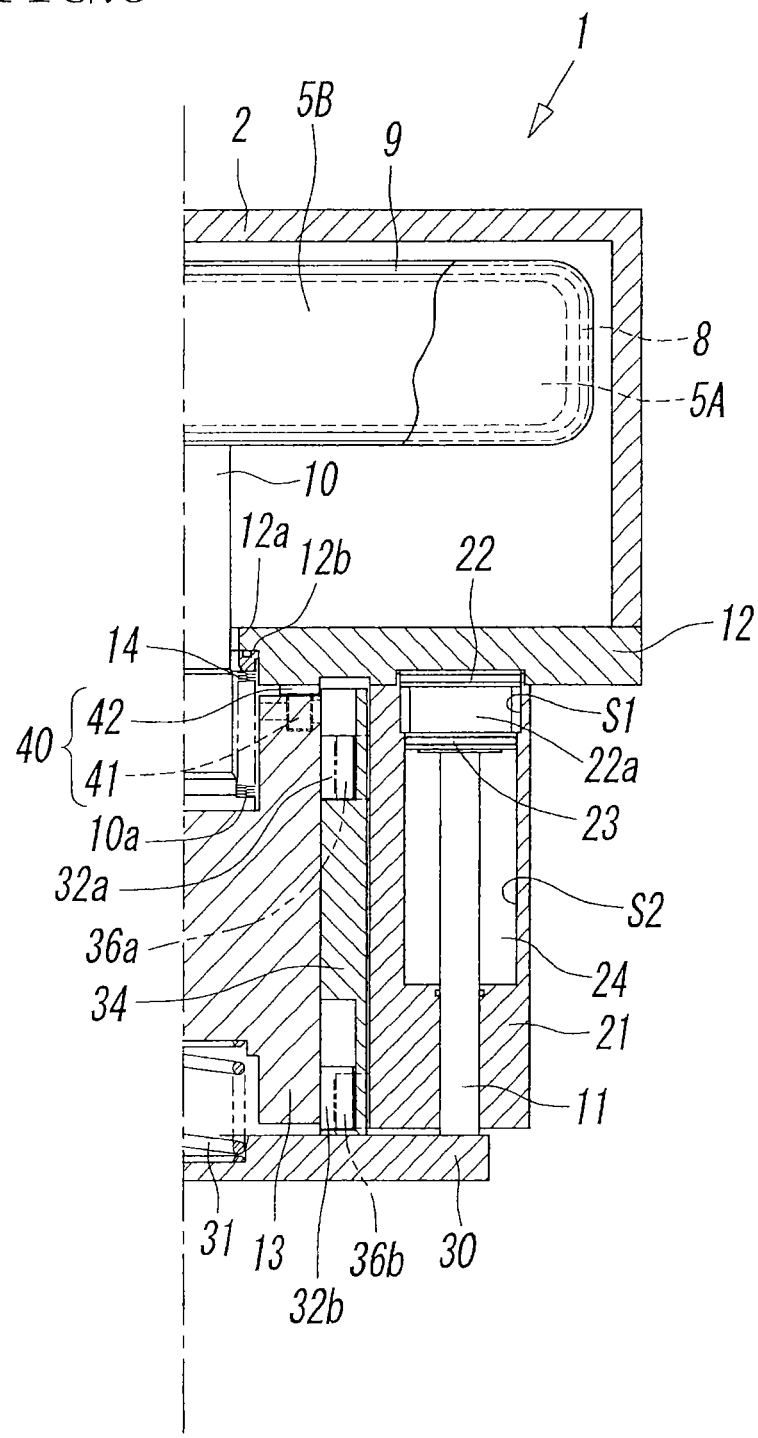
FIG. 8 is a sectional view showing a state in which the valve assembly is at a second closing position.

Radicals generated in the process chamber during workpiece processing deteriorate the valve seal member 8 of the first valve element 5A. Therefore, the valve seal member 8 needs to be periodically replaced. The inside of the process chamber also needs to be periodically cleaned. So, in the gate valve 1 according to the present invention, during such maintenance, the inside of the transfer chamber can be maintained in a vacuum state by hermetically closing the second opening 4 leading to the transfer chamber with the second valve element 5B as shown in FIG. 8.

When performing the maintenance, the air in the second cylinder chambers 25 and the third cylinder chamber 26 is released to the outside, and pressure air is supplied to the first cylinder chamber 24 so as to move the drive rods 11 upward. The cam grooves 33a and 33b move upward until the drive pistons 22 come into contact with the head-side ends as shown in FIG. 8. At this time, as shown in FIG. 9, the cam rollers 32a and 32b move to the C positions of the cam grooves 33a and 33b, respectively. At that time, the cam rollers 32a and 32b are pressed by the sloping groove walls of the cam grooves 33a and 33b, and move in a direction approaching the valve seat surface 7 of the second opening 4, perpendicularly to the valve seat surface 7. As a result, the shaft-side assembly moves together with the cam rollers 32a and 32b in the same direction, therefore the valve assembly 15 moves to the second closing position, the valve seal member 9 of the second valve element 5B is pressed against the valve seat surface 7, and the second opening 4 is hermetically closed.

Thus, by hermetically closing the second opening 4 and maintaining the vacuum state of the transfer chamber connected thereto during the maintenance, the transfer chamber can be continuously used, and the starting up of the apparatus after the maintenance can be speeded up.

As described above, the movement of the valve assembly 15 from the facing position to the first closing position or the second closing position is performed perpendicularly to the valve seat surfaces 6 and 7 by guiding the two cam rollers 32a and 32b with the cam grooves 33a and 33b, respectively, of the cam frames 34. The reaction force acting on the valve elements 5A and 5B from the valve seat surfaces when the valve seal members 8 and 9 are pressed against the valve seat surfaces 6 and 7 is received by the two guide rollers 36a and 36b through the cam frames 34.

Specifically, as shown in FIG. 7 and FIG. 9, when the valve assembly 15 is at the first closing position or the second closing position, the following equalities hold:

$$W1 \times L2 = F \times L1, \text{ and}$$

$$W2 = F + W1 = (1 + L1/L2)F,$$

where F is the reaction force acting on the valve elements 5A and 5B from the valve seat surfaces 6 and 7, W2 is the acting force acting on the first guide rollers 36a from the cam frames 34 (the reaction force acting on the cam frames from the first guide rollers 36a), W1 is the acting force acting on the second guide rollers 36b from the cam frames 34 (the reaction force acting on the cam frames from the second guide rollers 36b), L1 is the distance between the centers of the valve elements 5A and 5B and the centers of the first guide rollers 36a, and L2 is the distance between the centers of the first guide rollers 36a and the centers of the second guide rollers 36b. The reason is that the moments about the first guide rollers 36a due to the reaction force F acting on the first and second valve elements 5A and 5B from the valve seat surfaces 6 and 7 and the reaction force W1 acting on the cam frames 34 from the second guide rollers 36b are balanced with each other, and the reaction force W2 is equal to the sum of the reaction force F and the reaction force W1. That is, the acting force acting on the first guide rollers 36a from the cam frames 34 is greater than the acting force acting on the second guide rollers 36b from the cam frames 34. Therefore, as described above, the first guide rollers 36a are reinforced by having a larger diameter than the second guide rollers 36b. In particular, in this embodiment, the distance L1 between the centers of the valve elements 5A and 5B and the centers of the first guide rollers 36a is greater than the distance L2 between the centers of the first guide rollers 36a and the centers of the second guide rollers 36b, W2 is greater than twice F, and therefore the first guide rollers 36a are preferably reinforced.

When the first and second openings 3 and 4 of the gate valve 1 are opened from the hermetically closed state, that is, when the valve assembly 15 is moved from the first closing position or the second closing position to the fully opening position, the reverse process to closing the openings 3 and 4 of the gate valve 1 is performed.

Thus, according to the gate valve 1, by moving the valve assembly 15 composed of the first valve element 5A, the second valve element 5B, and the valve shaft 10 perpendicularly to the valve seat surfaces 6 and 7 around the first opening 3 and the second opening 4, the valve seal members 8 and 9 of the valve elements 5A and 5B can be brought into and out of contact with the valve seat surfaces 6 and 7 in a non-sliding manner, and therefore twisting of the valve seal members 8 and 9, generation of abrasion powder, and so forth can be suppressed not only when opening and closing the first opening 3 connected to the process chamber but also when opening and closing the second opening 4 connected to the transfer chamber. As a result, also when closing the second opening 4 at the time of maintenance work of the process chamber, the valve seal member 8 of the first valve element 5A, and so forth, vacuum leakage due to twisting of the valve seal member 9, generation of abrasion powder, and so forth can be suppressed, and the efficiency of maintenance work can be improved.

Although embodiments of the present invention have been described in detail, it goes without saying that the present invention is not limited to them, and various design changes can be made without departing from the scope of the present invention.

REFERENCE SIGNS LIST

1 gate valve
2 valve casing
2a, 2b side wall
3 first opening
4 second opening
5A first valve element
5B second valve element
6, 7 valve seat surface
8, 9 valve seal member
10 valve shaft
X1 axis line of valve shaft
11 drive rod
12 bonnet
13 lever member
15 valve assembly
20 air cylinder
27 roller frame
30 rod arm
31 compression spring
32a first cam roller
32b second cam roller
33a first cam groove
33b second cam groove
34 cam frame
35 guide groove
35a widened portion
36a first guide roller
36b second guide roller
40 stopper mechanism
41 stopping roller
42 contact portion
45 cushion rod
45a contact surface
46 cushion member

The invention claimed is:

1. A gate valve comprising:
a valve casing in which side walls facing each other are provided with a first opening connected to a process chamber and a second opening connected to a transfer chamber, and valve seat surfaces parallel to each other are formed around the openings;
a valve assembly including a valve shaft having a distal end and a proximal end in the longitudinal direction, and plate-like first and second valve elements attached to the distal end of the valve shaft and having valve seal members corresponding to the valve seat surfaces; and
an air cylinder, a drive rod of which is connected to the valve shaft,
wherein the valve assembly can be moved by the air cylinder from a fully opening position in which the valve elements are not opposite the openings, through a facing position in which the valve elements face the openings, to a first closing position in which the valve seal member of the first valve element is pressed against the valve seat surface around the first opening to close the first opening, and a second closing position in which the valve seal member of the second valve element is pressed against the valve seat surface around the second opening to close the second opening,
wherein the gate valve has a connecting mechanism connecting the drive rod and the valve shaft such that they can be displaced relative to each other, a parallel movement mechanism moving the valve assembly parallel to the valve seat surfaces, a perpendicular movement mechanism moving the valve assembly perpendicularly to the valve seat surfaces, and a stopper mechanism that, when the valve assembly is moved from the fully opening position to the facing position by the parallel movement mechanism, stops the parallel movement of the valve assembly and allows the perpendicular movement of the valve assembly by the perpendicular movement mechanism,
wherein the connecting mechanism has a rod arm fixed to the drive rod, a lever member fixed to the proximal end of the valve shaft, and a compression spring interposed between the lever member and the rod arm,
wherein the parallel movement mechanism has a pair of left and right cam frames fixed to the rod arm so as to face the left side wall and the right side wall of the lever member, a guide groove formed in each cam frame in the parallel movement direction, and a plurality of guide rollers attached to each of a pair of left and right roller frames fixed to a bonnet to which the valve casing is attached, and fitted in the guide groove, and the guide groove formed in each of the pair of left and right cam frames has a widened portion having an enlarged groove width at the end closet to the valve elements, and one of the plurality of guide rollers attached to each of the left and right roller frames that is closest to the valve elements is formed so as to be larger in diameter than the others and is fitted in the widened portion,
wherein the perpendicular movement mechanism has a plurality of cam grooves formed in each of the pair of cam frames, and a plurality of cam rollers provided on each of the left and right side surfaces of the lever member and fitted in the cam grooves; the cam grooves have, in the parallel movement direction, a beginning end position on the valve element side, a terminal end position on the opposite side thereto, and an intermediate position provided therebetween, and in the perpendicular movement direction, the intermediate position is provided closer to the first opening than the beginning end position, and the terminal end position is provided closer to the second opening than the beginning end position; and the cam rollers are disposed at the beginning end positions during the parallel movement in which the valve assembly is moved from the fully opening position to the facing position, the valve assembly occupies the first closing position when the cam rollers are moved to the intermediate positions, and the valve assembly occupies the second closing position when the cam rollers are moved to the terminal end positions.

2. The gate valve according to claim 1,
wherein the stopper mechanism has stopping rollers provided rotatably in the perpendicular movement direction and contact portions with which the stopping rollers come into and out of contact,
wherein the stopping rollers and the contact portions are provided on the lever member and the bonnet so as to face each other, and
wherein when the valve assembly is moved from the fully opening position to the facing position by the parallel movement mechanism, the stopping rollers come into contact with the contact portions and stop the parallel movement of the valve assembly, and when the valve assembly is moved perpendicularly by the perpendicular movement mechanism, the stopping rollers roll on the contact portions.

3. The gate valve according to claim 2, wherein in the stopper mechanism, pairs of the stopping roller and the contact portion are provided on both left and right sides of the valve shaft.

4. The gate valve according to claim 2, wherein the contact portions include cushion rods having, at one longitudinal end thereof, contact surfaces with which the stopping rollers are rollably in contact, and cushion members with which the other longitudinal ends of the cushion rods are in contact.

* * * * *